United States Patent
Iwasaki

(10) Patent No.: US 6,853,374 B2
(45) Date of Patent: Feb. 8, 2005

(54) IMAGE SPACE DISPLAY METHOD AND APPARATUS

(75) Inventor: Masajiro Iwasaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 497 days.

(21) Appl. No.: 10/097,244

(22) Filed: Mar. 15, 2002

(65) Prior Publication Data

US 2002/0145603 A1 Oct. 10, 2002

(30) Foreign Application Priority Data

Mar. 19, 2001 (JP) ......................................... 2001-079007
May 30, 2001 (JP) ......................................... 2001-162701
Mar. 11, 2002 (JP) ......................................... 2002-065213

(51) Int. Cl.⁷ ............................................. G06T 15/00
(52) U.S. Cl. ...................................................... 345/419
(58) Field of Search ................................ 345/419, 427, 345/428, 581, 440; 707/104.1, 100

(56) References Cited

U.S. PATENT DOCUMENTS 6,389,424 B1 * 5/2002 Kim et al. .................. 707/100
6,675,174 B1 * 1/2004 Bolle et al. ............... 707/104.1
6,745,205 B2 * 6/2004 Choi et al. ................ 707/104.1

OTHER PUBLICATIONS

Musha, et al., "A User Interface Visualizing Feature Space For Content-Based Image Retrieval", Technical Report of IEICE,IE98–204, pp. 141–148 (1998).
Junichi Tatemura, "Visual Interaction For Exploration In Information Space of Documents", Journal of JSSST, vol. 13, pp. 1–4, 1997.

* cited by examiner

*Primary Examiner*—Phu K. Nguyen
(74) *Attorney, Agent, or Firm*—Dickstein Shapiro Morin & Oshinsky LLP

(57) ABSTRACT

An image space display method facilitates a user to grasp a feature space by assigning each feature to a respective one of dimensional axes of a display space. The image-space display method extracts features from images, hierarchically divides a feature space of the features, virtually converts the images into a tree structure, divides a display space according to the tree-structure, and displays the image space by displaying the images on each of the divided display spaces. In the method a tree-structure is generated for each of the features. Dimension data corresponding to a number of the features is generated by mapping each tree structure in one-dimension. The dimension data is displayed on the corresponding divided display spaces as display coordinate-axis data.

16 Claims, 13 Drawing Sheets

IMAGE SPACE DISPLAY METHOD AND APPARATUS

BACKGROUND OF THE INVENTION

1. Field of the Invention

The present invention generally relates to a technique for displaying an image space and, more particularly, to an image space display method and apparatus for spatially displaying features of image.

2. Description of the Related Art

As for such a technique for displaying an image space, there are following techniques:

1) "A User Interface Visualizing feature Space for Content-Based Image Retrieval", Technical Report of IEICE, IE98-204; and 2) "Visual Interaction for Exploration in Information Space of Documents", Journal of JSSST, Vol.13.

The above-mentioned known technique 1) is a method for mapping image features on a display space of a 2-dimensional by reducing the number of dimensions of a multidimensional space according to principal component analysis. The above-mentioned known technique 2) introduces an idea of dynamic updating of visualized results in a visual classification technique where the updating is performed in response to a user operation, and the visual classification is given by arranging a large number of documents and keywords based on their mutual relationships.

However, the known technique 1) has a problem in that principal component analysis cannot be carried out when image features cannot be represented by vector data or when image similarity between images cannot be represented by a linear function. The known technique 2) has a drawback in that the number of keywords becomes large due to a large amount of computation, which makes a processing time lengthy, thereby making it unsuitable for interactive presentation.

On the other hand, when a plurality of features area extracted from an image so as to display the feature space thereof on a 3-dimensinal or 3-dimensional display space, a user can easily grasp the feature space if the features are assigned to the respective dimensional axes so as to give sense to each dimensional axis.

SUMMARY OF THE INVENTION

It is a general object of the present invention to-provide an improved and useful image space display method and apparatus in which the above-mentioned problems are eliminated.

A more specific object of the present invention is to provide an image space display method and apparatus which facilitates a user to grasp a feature space by assigning each feature to a respective one of dimensional axes of a display space.

In order to achieve the above-mentioned objects, there is provided according to one aspect of the present invention an image-space display method of extracting features from images, hierarchically dividing a feature space of the features, virtually converting the images into a tree structure, dividing a display space according to the tree-structure, and displaying the image space by displaying the images on each of the divided display spaces, the method further comprising the steps of: generating a tree-structure for each of the features; generating dimension data corresponding to a number of the features by mapping each tree structure in one-dimension; and displaying the dimension data on the corresponding divided display spaces as display coordinate-axis data.

According to the present invention, when a plurality of features are used, the tree-structure is generated for each of the features and each tree structure is mapped in one-dimension so as to dimensional data corresponding to the number of the features. The dimensional data is used as the display coordinate-axes data so as to map the features in the dimensions of the display space. Thus, the image space displayed by the method of the present enables a user to easily grasp the feature space.

In the image space display method according to the present invention, dividing the display space may include the step of: obtaining distances between each point of the features and center points of two clusters with respect to each point; sorting each points according to a difference between the obtained distances; and dividing the display space into two clusters by setting a boundary of the clusters according to an order of the sorting.

The boundary of the clusters may be set between points of which a difference of distances preceding and proceeding points is largest in the order of the sorting. A area corresponding to one of dimensions of the display space may be divided in accordance with distances to center points of the two clusters and a ratio of differences of the difference distances at the boundary of the clusters. The boundary of the clusters may correspond to a halfway point in the order of the sorting. The features may be three-dimensional data corresponding to form, texture and color of the images, and the features are displayed by using the three-dimensional data as display coordinate-axes data.

Additionally, there is provided according to another aspect of the present invention an image-space display method of extracting features from images, hierarchically dividing a feature space of the features, virtually converting the images into a tree structure, dividing a display space according to the tree-structure, and displaying the image space by displaying the images on each of the divided display spaces, the method further comprising the steps of: assigning the extracted features to respective dimensional axes of the display space; dividing recursively the feature space into four sub-spaces in accordance with the dimensional axes while reflecting a relationship between the images arranged in a two-dimensional display space in a relationship between the images on the feature space; and locating the tree-structure of each sub-space in four sub-spaces generated by dividing the two-dimensional display space.

According to the above-mentioned invention, an image feature space display process for mapping each feature on the dimensional axes of the display space can be performed with high accuracy, and the image space displayed by the method of the above-mentioned invention enables a user to easily grasp the feature space.

In the image space display method according to the present invention, when selecting a main image of each sub-space in the step of dividing into four sub-spaces, the main image may be sequentially determined based on a result of calculation according to an evaluation equation that is previously established based on a distance to main image previously determined in consideration with a positional relationship with respect to each feature.

Additionally, the once determined main image may be recalculated based on evaluation equations based on three other main images so as to determine the main image again based on a result of the recalculation. A position of the main image may be calculated repeatedly until a change in the position does not occur, and the position at which a change does not occur is selected as the position of the main image. When a number of images assigned to the closest main image exceeds a maximum number of images-containable in the sub-space containing the closest main image, a process of removing one of the images farthest to the main image from the sub-space concerned may be repeatedly performed so as to distribute the images uniformly to the sub spaces. A three-dimensional display space may be used instead of the two-dimensional display space.

Additionally, there is provided another aspect of the present invention an image-space display apparatus for extracting features from images, hierarchically dividing a feature space of the features, virtually converting the images into a tree structure, dividing a display space according to the tree-structure, and displaying the image space by displaying the images on each of the divided display spaces, the apparatus comprising: means for generating a tree-structure for each of the features; means for generating dimension data corresponding to a number of the features by mapping each tree structure in one-dimension; and means for displaying the dimension data on the corresponding divided display spaces as display coordinate-axis data.

Additionally, there is provided according to another aspect of the present invention an image-space display apparatus for extracting features from images, hierarchically dividing a feature space of the features, virtually converting the images into a tree structure, dividing a display space according to the tree-structure, and displaying the image space by displaying the images on each of the divided display spaces, the apparatus comprising: means for assigning the extracted features to respective dimensional axes of the display space; means for dividing recursively the feature space into four sub-spaces in accordance with the dimensional axes while reflecting a relationship between the images arranged in a two-dimensional display space in a relationship between the images on the feature space; and means for locating the tree-structure of each sub-space in four sub-spaces generated by dividing the two-dimensional display space.

Additionally, there is provided according to another aspect of the present invention a computer-readable medium having a program embodied therein for causing a computer to extract features from images, hierarchically divide a feature space of the features, virtually convert the images into a tree structure, divide a display space according to the tree-structure, and display the image space by displaying the images on each of the divided display spaces, said program comprising: a program code for generating a tree-structure for each of the features; a program code for generating dimension data corresponding to a number of the features by mapping each tree structure in one-dimension; and a program code for displaying the dimension data on the corresponding divided display spaces as display coordinate-axis data.

Additionally, there is provided according to another aspect of the present invention a computer-readable medium having a program embodied therein for causing a computer to extract features from images, hierarchically divide a feature space of the features, virtually convert the images into a tree structure, divide a display space according to the tree-structure, and display the image space by displaying the images on each of the divided display spaces, said program comprising: a program code for assigning the extracted features to respective dimensional axes of the display space; a program code for dividing recursively the feature space into four sub-spaces in accordance with the dimensional axes while reflecting a relationship between the images arranged in a two-dimensional display space in a relationship between the images on the feature space; and a program code for locating the tree-structure of each sub-space in four sub-spaces generated by dividing the two-dimensional display space.

Other objects, features and advantages of the present invention will become more apparent from the following detailed description when read in conjunction with the accompanying drawings.

DETAILED DESCRIPTION OF THE PREFERRED EMBODIMENTS

First Embodiment

Figure 1:
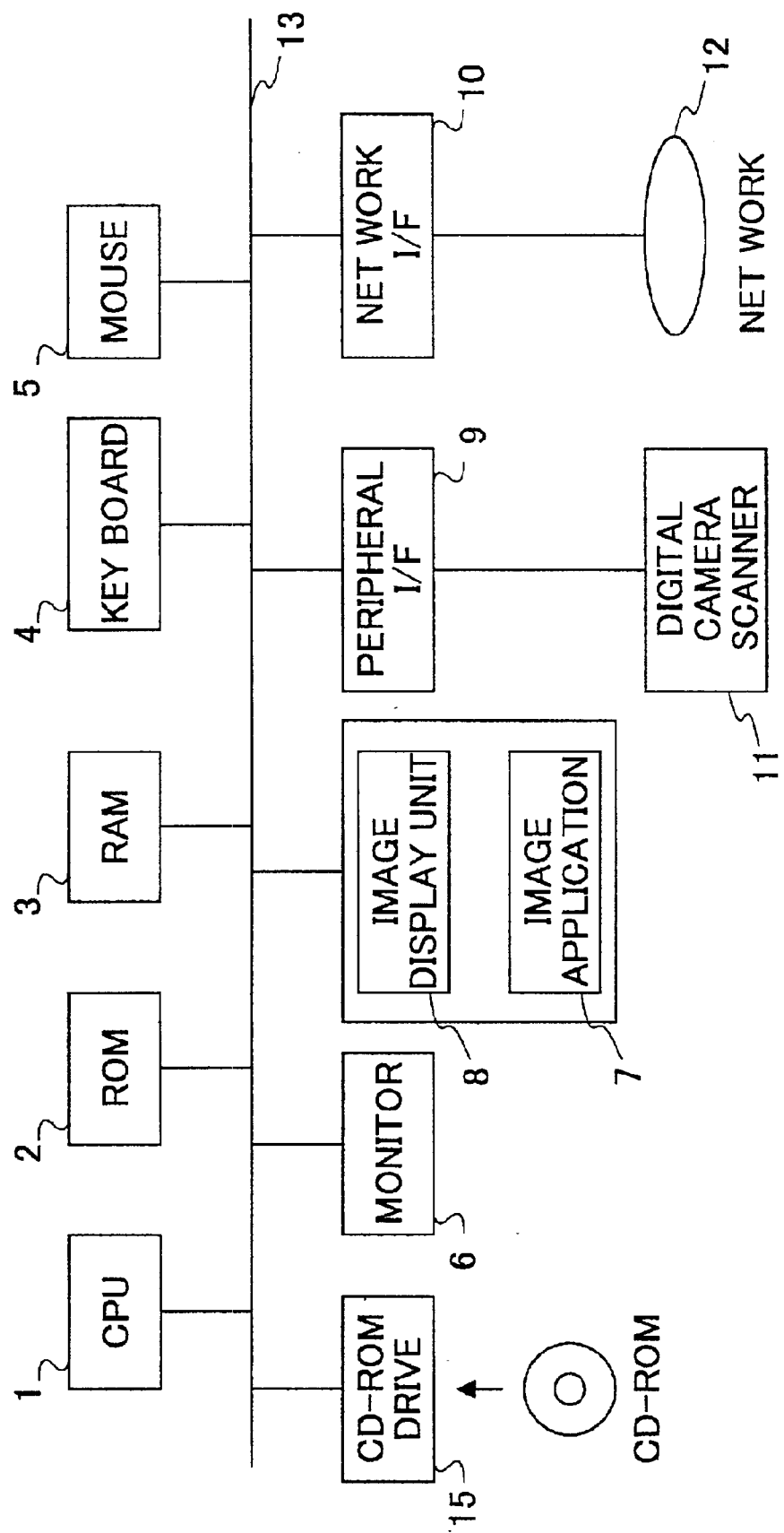
FIG. 1 is a block diagram of an image display apparatus according to a first embodiment of the present invention.
Figure 2:
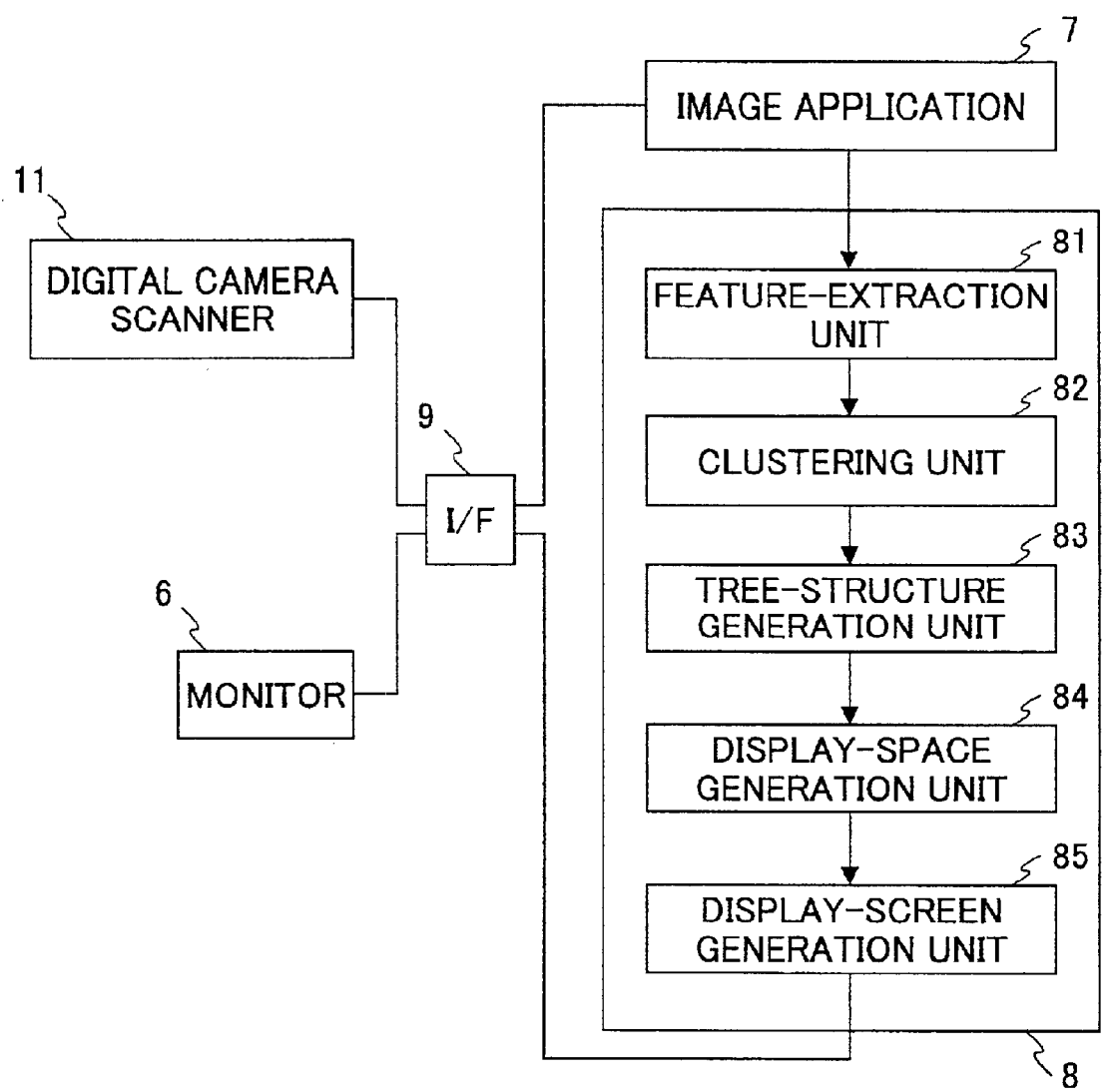
FIG. 2 is a block diagram of a part of the image display apparatus performing an image display process.

A description will now be given of a first embodiment of the present invention. FIG. 1 is a block diagram of an image display apparatus according to a first embodiment of the present invention. FIG. 2 is a block diagram of a part of the-image display apparatus performing an image display process.

In FIG. 1, the image display apparatus comprises: a central processing unit (CPU) 1 which controls an entire operation of the image display apparatus; a read only memory (ROM) 2 which stores programs executed by the CPU 1; a random access memory (RAM) which stores dynamic data for executing the programs stored in the ROM 2 and serves as a work area when the programs are executed; a keyboard 4 and a mouse 5 as input devices; a monitor 6 as a display apparatus; an image display unit 8 which executes an image application 7; a peripheral interface (I/F) 9 which functions as an interface with a peripheral device 1 such as a digital camera or a scanner; and a network I/F 10 which functions as an interface with a network 12. These components are connected to each other via a bus 13 so as to be controllable by the CPU 1 so that those components together serves as a computer to carry out various functions of the present invention.

Additionally, a memory-media driving unit 15 such as a CD-ROM driving unit is connected to the bus 13. The memory-media driving unit 15 reads program codes from a memory medium such as a CD-ROM so as to load the program codes stored in the memory medium to the computer so that the computer carries out various functions of the present invention mentioned later.

The image display part 8 comprises, as shown in FIG. 2, a feature-extraction unit 81, a clustering unit 82, a tree-structure generation unit 83, a display-space generation unit 84 and a display-screen generation unit 85. The units 81–85 perform a feature-extraction process, a clustering process, a tree-structure generation process, a display-space generation process and a display-screen generation process, respectively, in accordance with the image application 7.

A description will now be given of processes performed by the image display part 8 having the above-mentioned structure. The processes include 1) a feature-extraction process, 2) a feature-space tree-structure extraction process and 3) an image display screen generation process.

1) Feature-Extraction Process:
As a feature of an image, there are various features such as a histogram feature, an edge feature or a texture feature. The present invention is applicable to any features. Of course, the present application is applicable to features extracted from data other than image data. For example, the present invention is applicable to features extracted from text data. Here, a description will be given of an extraction process of a general histogram feature. As the image data from which features area extracted, there is image data supplied by the peripheral devices 11 such as a digital camera or a scanner, or image data downloaded from the Web. There is no limitation with respect to the input method.

First, a suitable color space (for example, Lab, Luv, HSV, etc.) is selected, and the selected color space is divided into a plurality of areas. Then, an investigation is performed as to which pixel of the image corresponds to which area of the color space. After counting the number of pixels for each area, the pixel number data is normalized based on the number of whole pixels. The normalized data of the number of pixels for each area corresponds to the histogram feature. The feature of a histogram serves as a point of the feature space of the histogram. As a distance between two features in the feature space of a histogram, a sum total of differences of the numbers of pixels for each corresponding area of the two features or a Euclid distance is generally use. In this way, the distance between features can be obtained.

2) Feature-Space Tree-Structure Extraction Process:

A feature space is a high order dimension space, and cannot be simply displayed in 2-dimension on a screen. Thus, the structure of a feature space is first expressed by a tree-structure. Then, the feature space can be virtually expressed on a screen by mapping the tree structure on the space of the screen.

Figure 3:
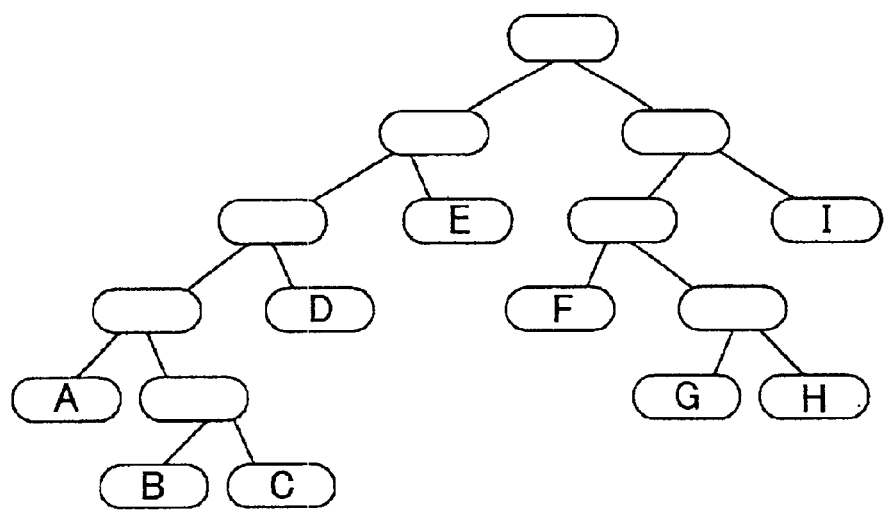
FIG. 3 is an illustration of a tree structure generated by the image display process.

In order to express the feature space by a tree-structure, the feature space is clustered, and is divided into a plurality of sub-spaces so as to form nodes of the tree-structure. Further, each subspace (node) is clustered, and is divided into sub-spaces to form nodes. The tree structure of the feature space is can be generated by performing the above-mentioned operation recursively. That is, all features are arranged in the lowermost nodes, respectively, on an individual node basis. FIG. 3 shows an example of the thus-formed tree-structure. Although the number of nodes which divide the space may be any number equal to or greater than 2, the number of nodes here is set to 2 for the sake of convenience. In this tree structure, similar features are arranged close to each other, and a positional relationship of images on the image space is expressed by the tree structure.

As for a clustering method, the general Nearest Neighor method, the K-average algorithm method, etc. can be used. Although similar images are arranged close to each other in this tree structure, other accuracies depend on the accuracy of clustering Thus, a method for improving the accuracy of clustering, a clustering according to the following procedures can be used. It should be noted that the dividing number is set to 2 in this method.

(i) Acquisition of Center Point of Cluster:
a) select an arbitrary point A in a space.
b) set the farthest point from the selected point A as a center point C1 of the first cluster; and
c) set the farthest point from the point C1 as a center point C2 of the second cluster.

(ii) Sort of Points:
a) select an arbitrary point P in a space.
b) calculate distances between the selected point P and each of center points C1 and C2 of two clusters, and obtain a difference between the calculated distances as a difference distance;

$$\text{difference distance} = ||C1-P| - |C2-P||$$

c) repeat a) and b) so as to obtain the difference distance for all points; and
d) sort all points according to ascending order of the difference distances.

(iii) Division of Point:

A difference between difference distances of opposite sides of the point sorted according to the difference distance is obtained so as to set a boundary of clusters between points of which distance is largest. The side of which difference distance is smaller than a distance to the boundary of cluster belongs to C1, and the side of which difference distance is larger than a distance to the boundary of cluster belongs to C2. Moreover, the tree structure should be well-balanced. That is, when it is desired to distribute images at an equal interval on a final display screen, the separation may be performed at the middle of the number of images. The thus-obtained two clusters are set as nodes of a tree so as to recursively perform the same processes (1), (2) and (3) for each node. A tree is generated by this operation, and finally each image belongs to a leaf node.

With the conventional technique, a screen is generated from the thus-generated one tree-structure. However, in the present invention, a tree structure is generated with a meaningful feature unit, and a tree structure in the binary-tree form is generated for each feature. The features having such a meaning are color, form or texture, and an axis of a screen generated by the following screen generation process corresponds to each feature.

3) Image Display Screen Generation Process:

After generating the tree structure, each tree structure is mapped in 1-dimension. The display area on a screen is a data area for mapping in 1-dimension.

The tree structure is traced from a root thereof, and a) the data area is divided into two so that the two child nodes are arranged in the respective areas. The area may be equally divided. In order to improve display accuracy, the dividing points may be decided in proportion to the number of nodes belonging to a child node or in proportion to a distance between a dividing point at the time of clustering and each center point. Furthermore, also in consideration of the distance of a gap between clusters, a area corresponding to the space of the gap may be set and the space is not provided with a child node. According to such a method, the display screen can express further accurate similarity.

b) Perform the above-mentioned 1) feature-extraction process and 2) feature-space tree-structure extraction process with respect to each child node.

Thus, by processing recursively, all tree structures are mapped in 1-dimension.

Figure 4:
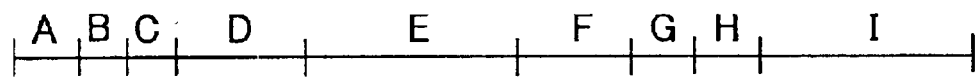
FIG. 4 is an illustration of a 1-dimensional map of the tree structure shown in FIG. 3.

FIG. 4 is an example of mapping of a tree structure shown in FIG. 3. In this example, the area is equally divided while tracing the tree structure.

By performing the above-mentioned process with respect to all tree structures, multidimensional data corresponding to the number of tree structures can be obtained. As for a screen display, since it is difficult to express in more than three dimensions, the data is preferably up to three dimensions. For example, if a tree-structure is generated based on the features of color, form an texture, the 3-dimensional display space having axes corresponding to color, form and texture shaft, respectively, can be generated.

Figure 5:
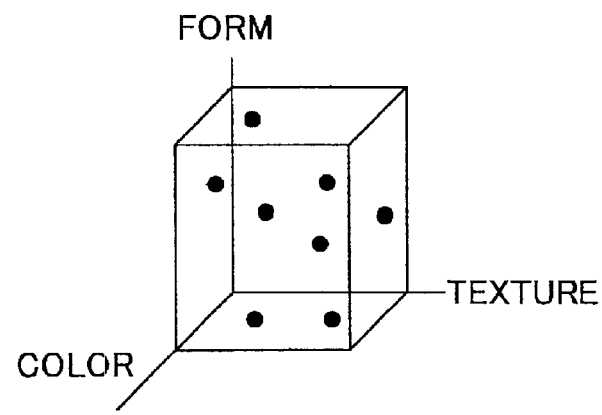
FIG. 5 is an illustration showing a relationship between 3-dimensional display space and features (form, texture, color) extracted from an image.

FIG. 5 shows an example of a final spatial screen display. Each point shown in FIG. 5 is a location of the feature which is extracted from an image according to parameters of form, texture and color, and the image may be displayed at that location as it is. It should be noted that, although form, texture and color extracted from an image are rendered to be features in the present embodiment, the present invention is not limited to such a feature and can be applied to any features such as a feature extracted from text data.

A description will now be given, with reference to FIG. 17 through FIG. 21, of an image space display process according to the first embodiment of the present invention. The image space display process is performed by executing programs stored in the ROM 2 while the CPU 1 uses the RAM 3 as a work area. In the image space display process according to the present embodiment, a feature is assigned to each display dimension axis.

Figure 17:
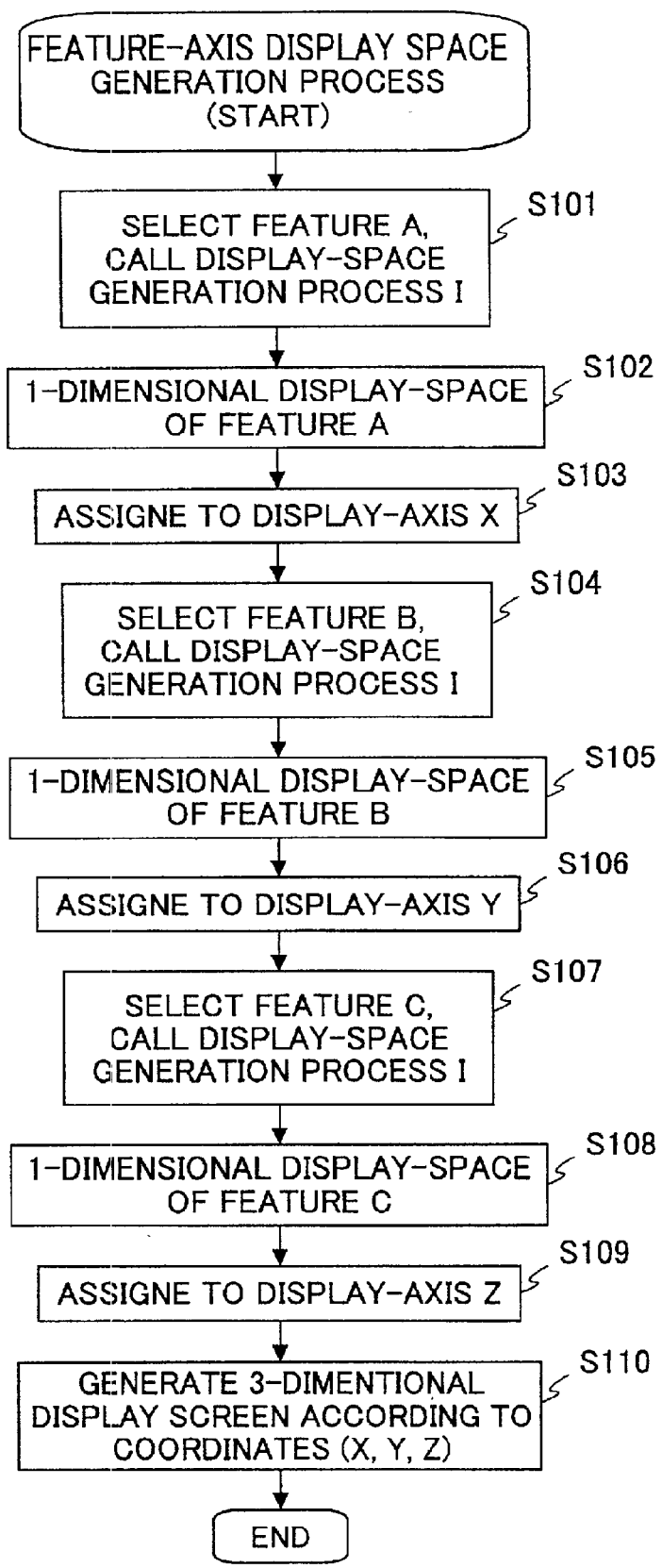
FIG. 17 is a flowchart of a feature-axis display space generation process according to the first embodiment of the present invention.

FIG. 17 is a flowchart of a process of generating a feature-axis display space. In this process, first, a feature A is selected and a call is made for a display-space generation process I so as to generate a 1-dimensional display space (step S101). Subsequently, the coordinates of the 1-dimensional display space of the feature A are acquired (step S102), and the acquired coordinates are set as coordinates of a display axis X (step S103). Additionally, a feature B is selected and a call is made to the display-space generation process I so as to generate a 1-dimensional display space (step S104). Then, the coordinates of the 1-dimensional display space of the feature B are acquired (step S105), and the acquired coordinates are set as coordinates of a display axis Y (step S106). Further, a feature C is selected and a call is made to the display-space generation process I so as to generate a 1-dimensional display space (step S107). Then, the coordinates of the 1-dimensional display space of the feature B are acquired (step S108), and the acquired coordinates are set as coordinates of a display axis Z (step S109). Finally, a 3-dimensional display screen is generated based on coordinate values of the display axes acquired in the process of steps S103, S106, and S109. It should be noted that, in this process, the process of steps S101–S103 makes the feature A to correspond to the coordinate axis X, the process of steps S104–S106 makes the feature B to correspond to the coordinate axis Y, and the process of steps S107–S109 makes the feature C to correspond to the coordinate axis Z.

Figure 18:
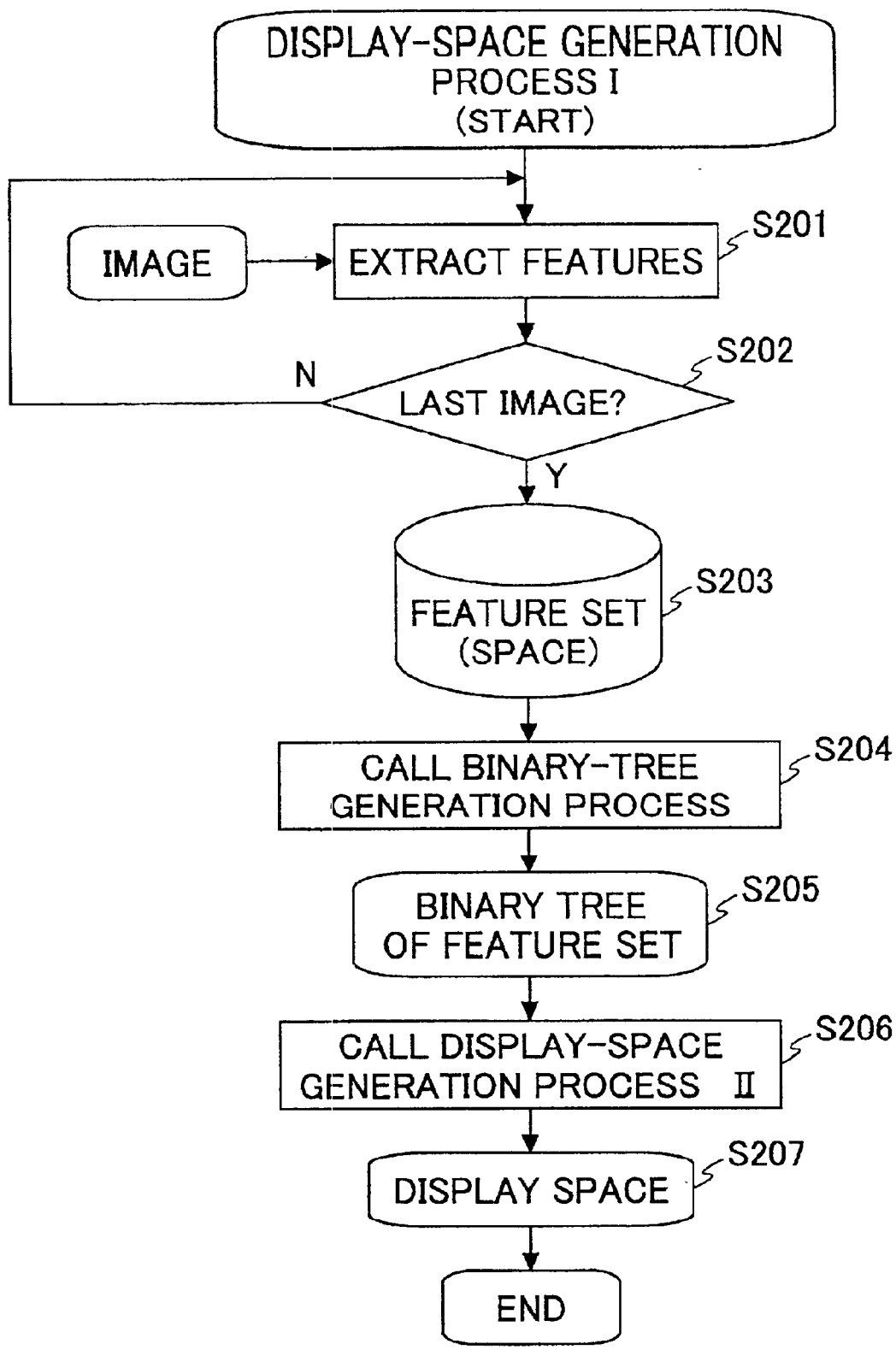
FIG. 18 is a flowchart of a display-space generation process I according to the first embodiment of the present invention.
Figure 19:
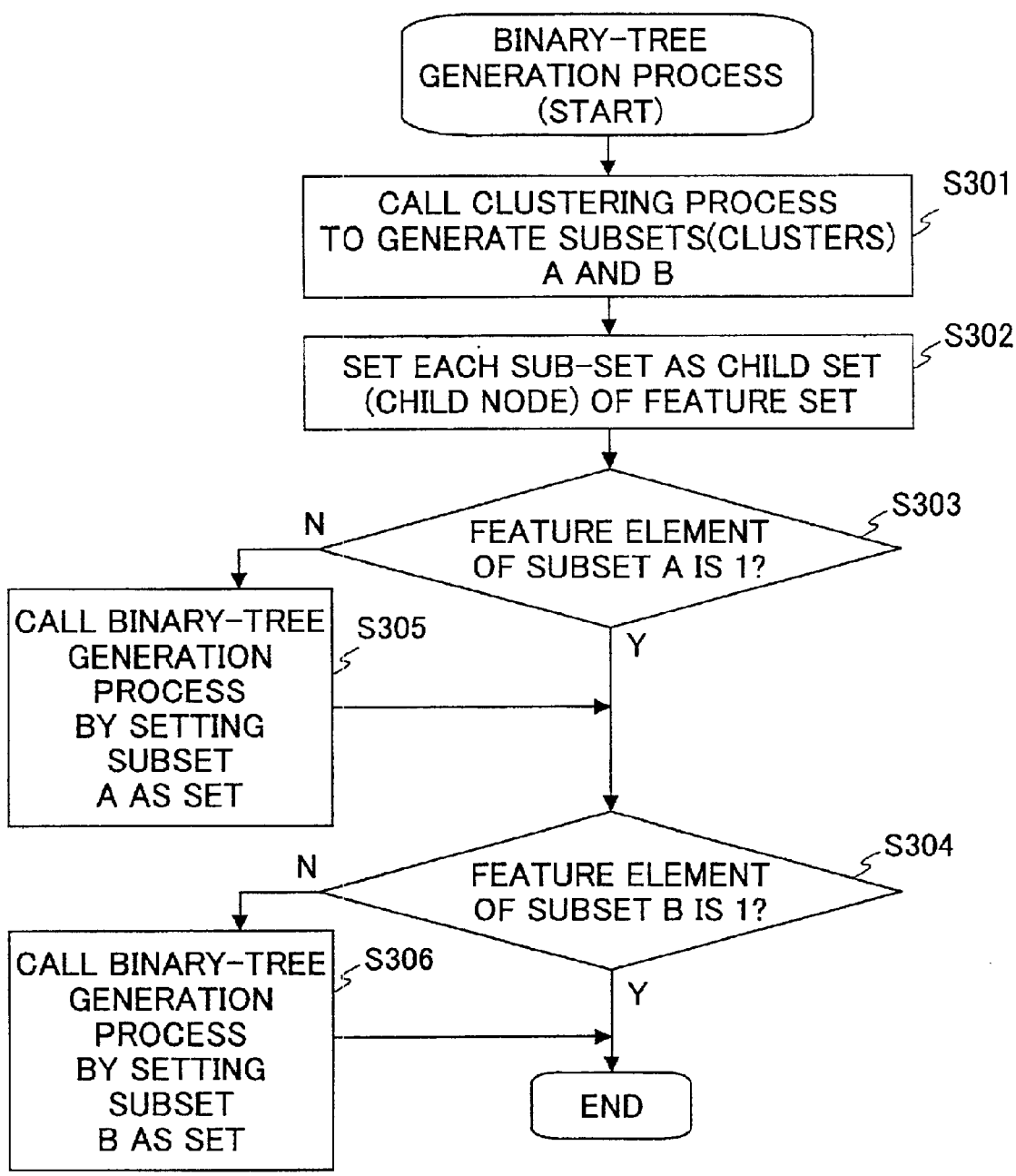
FIG. 19 is a flowchart of a binary-tree generation process according to the first embodiment of the present invention.

FIG. 18 is a flowchart of the above-mentioned display-space generation process I. In this process, when image data is input, the image feature is extracted to the last image (steps S201 and S202) so as to obtain a set of features (feature space) (step S203). Subsequently, a binary-tree generation process shown in FIG. 19 is called (step S204), and the binary-tree generation process is performed with respect to the set of the features (step S205). Then, a display-space generation process II shown in FIG. 20 is called based on root sets (nodes) of the binary tree and a display space as inputs (step S206), and the display space is generated by performing the display space generation process II (step S207).

Figure 20:
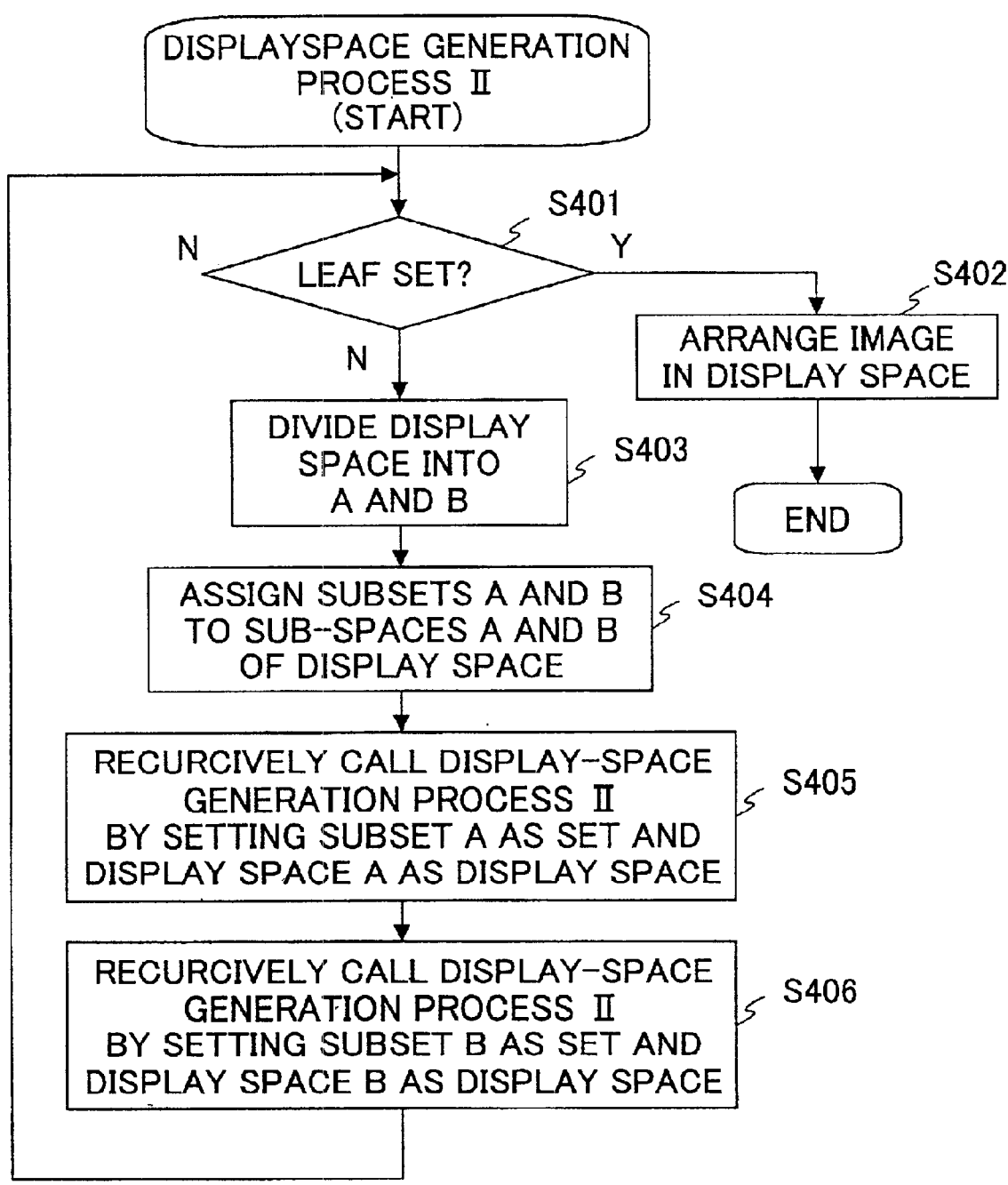
FIG. 20 is a flowchart of a display-space generation process II according to the first embodiment of the present invention.
Figure 21:
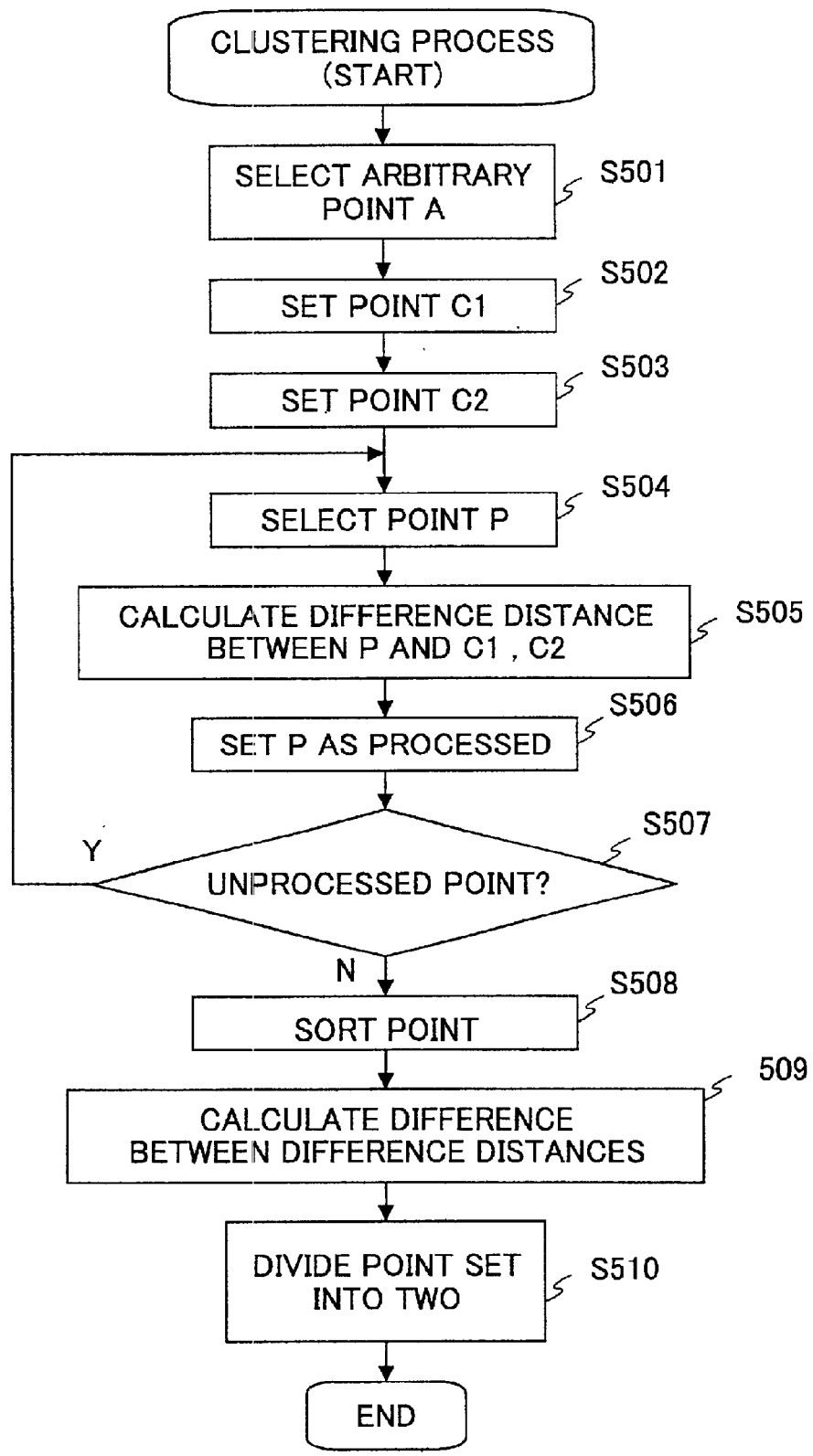
FIG. 21 is a flow chart of a clustering process according to the first embodiment of the present invention.

The routine performed at the time of execution of the display space generation process I shown in FIG. 18 is shown in FIGS. 19 through 21. FIG. 19 is a flowchart of a binary-tree generation process, which is called in step S204 and performed in step S205. In this process, a call is made to the clustering process shown in FIG. 21 so as to generate two subsets (clusters) A and B by half-dividing a feature set calling (step S301). The clustering process has been described in the description of 2) feature-space tree-structure extraction process. When the subsets A and B are generated, each of the subsets A and B is set as a child set (child node) of the feature set (step S302). Then, it is determined whether or not the feature element of the subset A is 1 (step S303). If the feature element of the subset A is 1, it is determined whether or not the feature element of the subset B is 1 (step S304). Moreover, if the feature element of the subset A is not 1 in step S303, the binary-tree generation process is called so as to perform the process after step S301 by regarding the subset A as a set, and also perform the process of step S304. This process is ended if the feature element of the subset B is 1 in step S304. If the feature element of the subset B is not 1, the binary-tree generation process is called in step S305 (step S306) so as to perform the process after step 301 by regarding the subset B as a set, and the process is ended.

FIG. 20 is a flowchart of the display-space generation process II, which is called in step S206 and performed in step S207. In this process, it is judged whether or not all the features are sets (leaf sets) belonging to the respective lowermost nodes (step S401). If they are leaf sets, the image is arranged in the display space (step S402), and the process is ended. On the other hand, if it is judged in step S401 that the features are not leaf sets, the display space is divided into subsets A and B (step S403). Then, each of the subsets A and B corresponding to children of the binary tree is assigned to a respective one of the sub-spaces A and B (step S404). Then, the display-space generation process II is called recursively by regarding the subset A as a set and the sub-space A as a display space (step S405). Then, the display-space generation process II is called recursively by regarding the subset B as a set and the sub-space B as a display space (step S406). The process of steps S403, S404 and S405 is repeated until a leaf set is formed, and the image is arranged in the display space after the leaf set is established (step S402).

FIG. 21 is a flowchart of the clustering process, which is performed in step S301. As described in the feature-space tree-structure extraction process, first, an arbitrary point A is selected (step S501), and a point farthest to the selected point A is set as point C1 (step S502). Then, a point farthest to the point C1 is set as point C2 (step S503), and an arbitrary point P, which has not been processed, is selected (step S504). Next, difference distances between the Point P and each of the points C1 and C2 are calculated (step S505). Then, the selected point P is rendered as a point, which has been processed (step S506). The process of steps S504 through S506 is repeated until unprocessed points are eliminated (step S507). After all points have been processed, all points are sorted according to an ascending order of the difference distances (step S508). Then, a difference between difference distances preceding and proceeding each point is calculated for all sorted points (step S509), and the set of points is divided at a cluster boundary where the difference between difference distances is maximum (step S510). It should be noted that, although the features are assigned to the display-space dimensional axes as shown in FIG. 17 in the present embodiment, the above-mentioned display-space generation process I may be called when the features are not assigned to the display dimensional axes.

Second Embodiment

A description will now be given of a second embodiment of the present invention.

An image display apparatus according to the second embodiment of the present invention is the same as the image display apparatus according to the above-mentioned first embodiment. Additionally, the image display apparatus according to the second embodiment has the same structure as that shown in FIG. 2, and description thereof will be omitted.

A description will be given below of a process performed by the image display unit 8 according to the second embodiment. The process performed by the image display unit 8 includes 1) feature-extraction process, 2) feature-space division process and 3) image-display screen generation process.

1) Feature-Extraction Process:

This processing is the same as the 1) feature-extraction process of the above-mentioned first embodiment, and a description thereof will be omitted.

Figure 6:
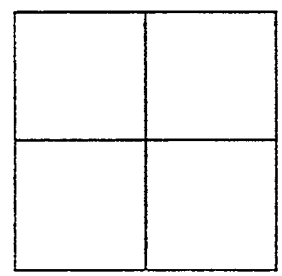
FIG. 6 is an illustration showing a 2-dimensional feature space, which is divided into four parts, according to a second embodiment of the present invention.
Figure 7:
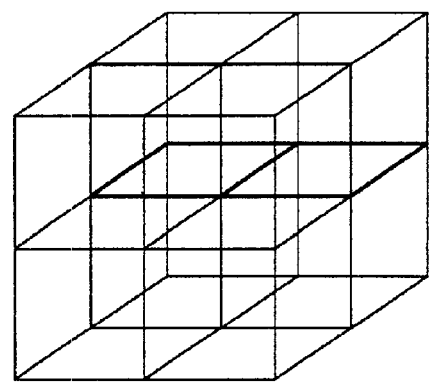
FIG. 7 is an illustration showing a 3-dimensional feature space, which is divided into eight parts, according to a second embodiment of the present invention.

2) Feature-Space Division Process:

A feature space is divided so as to assign a feature to a display space. A description will be given below of a dividing method of a feature space in a case where a 2-dimensional display space is generated. It is assumed that features A and B are extracted from each image so that the feature A is assigned to the X-axis of the display space and the feature B is assigned to the Y-axis of the display space. In the case of a 2-dimensional display space, the feature space is divided into four (FIG. 6). In the case of a 3-dimensional display space, the feature space is divided into eight (FIG. 7).

In the quarter division, a positional relationship between the divided spaces can be accurately reflected to the division by following the procedure described below.

It should be noted that, if the feature A of an image a is represented as FAa and the feature B of an image b is represented as FAb, a distance (0–1) between the image a and the image b in the space of the feature A is expressed by DA(FAa,FAb). Similarly, a distance (0–1) between the image a and the image B in a space of the feature B is expressed by DB(FBa,FBb). The value of the distance ranges from 0 to 1.

i) Acquisition of the Main Feature of Each Sub-Space:

A description will be given, with reference to FIGS. 8 through 11, of a procedure for acquiring a main feature of each sub-space.

Figure 8:
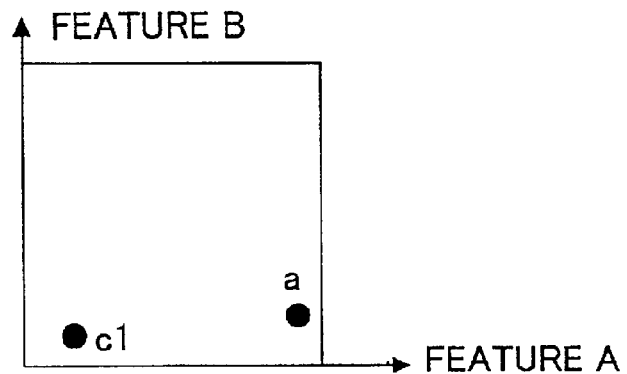
FIG. 8 is an illustration for explaining a procedure of acquiring each sub-space in the second embodiment of the present invention.
Figure 9:
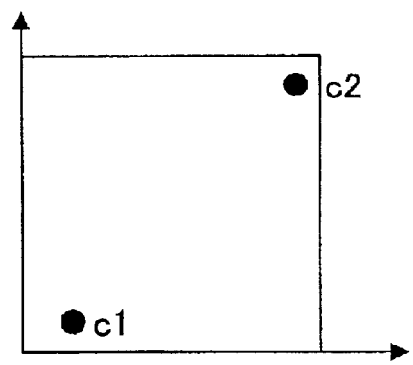
FIG. 9 is an illustration for explaining a procedure of acquiring each sub-space in the second embodiment of the present invention.

First, a) an arbitrary image a is selected within a space (FIG. 8).

Then, b) an image that is farthest to the selected image with respect to the two features is set as a main image c1 of a sub-space (lower left sub-space in FIG. 8). That is, the image c which maximizes the following evaluation equation (1) is set as the main image c1.

$$DA(FAa,FAc)+DB(FBa,FBc) \qquad (1)$$

Moreover, c) an image that is farthest to the image c1 with respect to the two features is set as a main image c2 of a sub-space (upper right sub-space in FIG. 9) located along a diagonal line. That is, the image c which maximizes the following evaluation equation (2) is set as the main image c2.

$$DA(FAc1,FAc)+DB(FBc1,FBc) \qquad (2)$$

Figure 10:
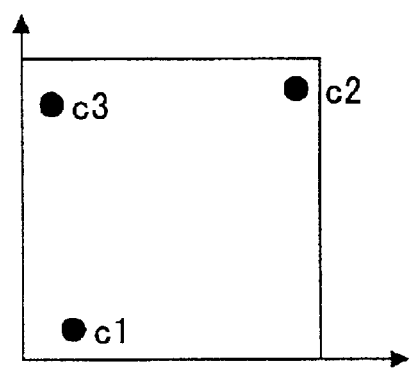
FIG. 10 is an illustration for explaining a procedure of acquiring each sub-space in the second embodiment of the present invention.

Furthermore, d) an image, which is close to c1 with respect to the feature A and remote from c1 with respect to the feature B and remote from c2 with respect to the feature A and close to c2 with respect to the feature B, is set as a main image c3 of the third sub-space (upper left sub-space in FIG. 10). That is, the image c which maximizes the following evaluation equation (3) is set as the main image c3.

$$(1-DA(FAc1,FAc))+DB(FBc1,FBc)+DA(FAc2,FAc)+(1-DB(FBc2,FBc)) \qquad (3)$$

Figure 11:
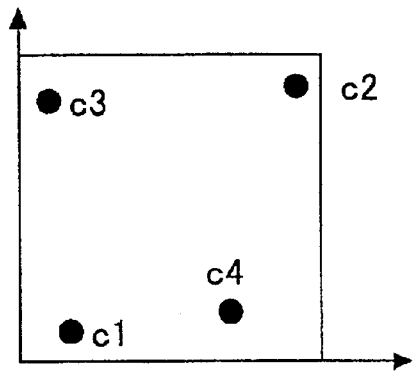
FIG. 11 is an illustration for explaining a procedure of acquiring each sub-space in the second embodiment of the present invention.

Finally, e) an image, which is close to c1 with respect to the feature B and remote from c1 with respect to the feature A and remote from c2 with respect to the feature B and close to c2 with respect to the feature A and remote from 3 with respect to both the features A and B, is set as a main image c4 of the fourth sub-space (lower right sub-space in FIG. 11). That is, the image c which maximizes the following evaluation equation (4) is set as the main image c4.

$$DA(FAc1,FAc)+(1-DB(FBc1,FBc))+(1-DA(FAc2,FAc))+ \\ DB(FBc2, FBc)+DA(FAc3,FAc)+DB(FBc3,FBc) \quad (4)$$

Although the four main images are determined with respect to c1, c2 and c3, it is not determined based on a relation with all other main images. In a case in which there is a margin of a process time, a much more accurate main image can be acquired by redetermining all main images based on the evaluation equation in e).

Figure 12:
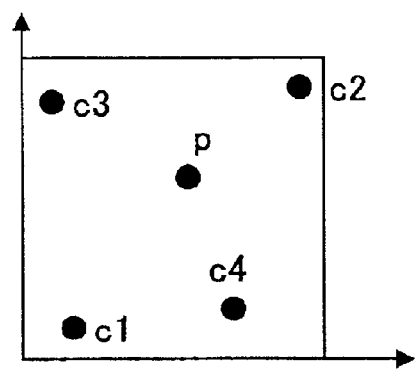
FIG. 12 is an illustration for explaining a procedure of distributing images to sub-spaces in the second embodiment of the present invention.

By performing the above-mentioned process repeatedly until a change in a main image is eliminated, a further higher accuracy can be achieved. However, since it takes a long process-time to achieve a higher accuracy, a selection should be made for the process to be used in accordance with a processing speed required by an application.

ii) Distribution of Images:

The remaining images are selected one by one and distances to c1 through c4 are calculated so as to locate the selected image in a farthermost sub-space. That is, a main image cn (n=1-4), which minimizes the following distance, is obtained with respect to an image p shown in FIG. 12, and the obtained main image is located in a sub-space n of the main image.

$$DA(FAp,FAcn)+DB(FBp,FBcn) \quad (5)$$

Figure 13:
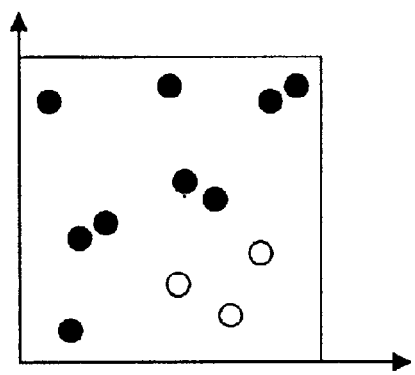
FIG. 13 is an illustration for explaining a procedure of distributing images to sub-spaces in the second embodiment of the present invention.

In this way, an image can be divided into four sub-spaces. The above-mentioned method can be expanded to a case of a 3-dimensional display space by assigning three features to each dimensional axis in the same manner (FIG. 13).

Then, the above-mentioned process of i) and ii) is applied to the thus-obtained four sub-spaces. In this way, each sub-space can be subdivided by recursively processing the thus-generated sub-spaces. This process is repeated until only one image is located in each sub-space. As a result, the sub-spaces are expressed by the tree-structure as shown in FIG. 14, and the tree-structure extraction process of a feature space is completed.

Figure 14:
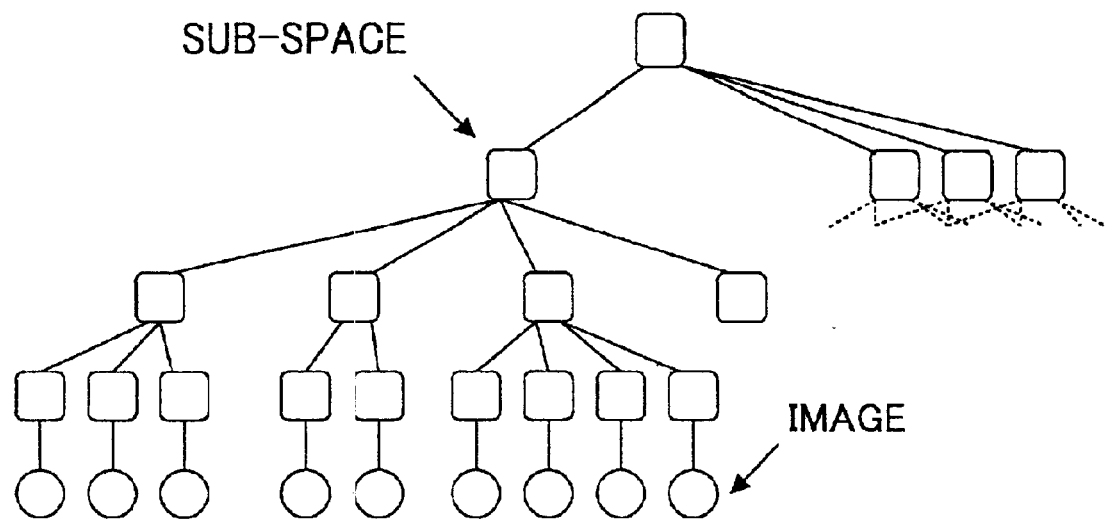
FIG. 14 is an illustration of a structure generated in the second embodiment.
Figure 15:
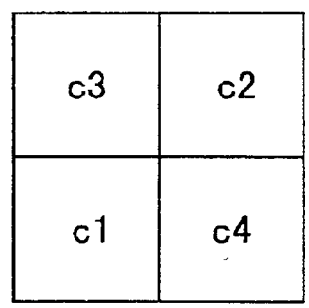
FIG. 15 is an illustration for explaining a procedure of generating an image display screen in the second embodiment of the present invention.

3) Image display screen generation process:

In the image-display screen generation process, as shown in FIG. 14, the expressed tree-structure is traced from a root thereof, and a) a display space is divided into four c1–c4, as shown in FIG. 15. A simple division is used for the dividing method. It should be noted that although the equal-division has been explained above, there are following methods, for example.

A method of dividing a display space while making the area of the display space in proportion to a number of images contained in each sub-space.

A method of dividing a display space in proportion to a size of each sub-space which size is set as the maximum value of a distance between arbitrary two points within the sub-space.

b) Each sub-space of the tree-structure is assigned to a respective one of the divided display spaces. At this time, the positional relationship between the sub-spaces must be corresponded to the positional relationship, which has been taken into consideration at the time of generating the sub-spaces. If it is a sub-space of a leaf node of the tree-structure, the image is arranged on the display space since that image is assigned to the node.

c) The processes of the above-mentioned a), b) of 3) are recursively performed on lower order sub-spaces of each sub-space.

Figure 16:
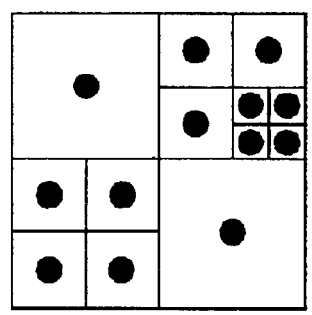
FIG. 16 is an illustration for explaining a procedure of generating an image display screen in the second embodiment of the present invention.

According to the above-mentioned operation the image of in the form of a tree-structure can be arranged in the display space, as shown in FIG. 16. However, the distribution of the image in the thus-generated display space is not uniform. There may be a case in which an application requires a uniform distribution. An uneven distribution is caused by unevenness in the number of images assigned to each sub-space at the time of generating the sub-space. Then, a description will be given below of a method of assigning images to a sub-space uniformly.

d) When assigning images uniformly to sub-spaces, a process of acquiring a main feature of each sub-space in the above-mentioned dividing process of a feature space described in the item 2) is the same as the process of the above-mentioned item 2)-i).

However, the distribution of images in the item 2)-ii) is performed as follows.

1) The maximum number of images of each sub-image is determined from the number M of whole images in the space, and the following relationship is set.

$$M=N/4+1$$

2) An image is selected from the remaining images one by one so as to calculate distances DA(FAp, FAcn)+DB(FBp, FBcn) to c1 through c4. The selected image is located the nearest sub-space (temporarily referred to as A).

3) When the number of images which belongs to the sub-space A exceeds M sue to introduction of the distances to c1–c4 into the above-mentioned sub-space A, an image farthest to the main image within the sub-space A is removed from the sub-space A. Then, distances to other sub-spaces is calculated with respect to the removed image, and the removed image is located in the farthermost sub-space (temporarily referred to as B). However, when the number of images which belong to the sub-space B exceeds M sue to the location of the image in the partial space B, one image is removed from the sub-image B in the same manner so as to perform the same process with respect to sub-spaces other than A and B. This process is repeated until the number of images becomes less than M.

4) All images are assigned by repeating the process of 1), 2) and 3).

Thus, the image is uniformly allocated to the display space. The present embodiment assumes that features are assigned to display dimensional axes and to achieve a higher accuracy than the first embodiment. Therefore, the above-mentioned feature axis display space generation process shown in FIG. 17 is not performed, but the process of FIGS. 18 through 21 is performed. However, the binary-tree generation process shown in FIG. 19 is replaced by a process shown in FIG. 22. Therefore, in the present embodiment, the clustering process in step S301 is replaced by the clustering process shown in FIG. 22.

Figure 22:
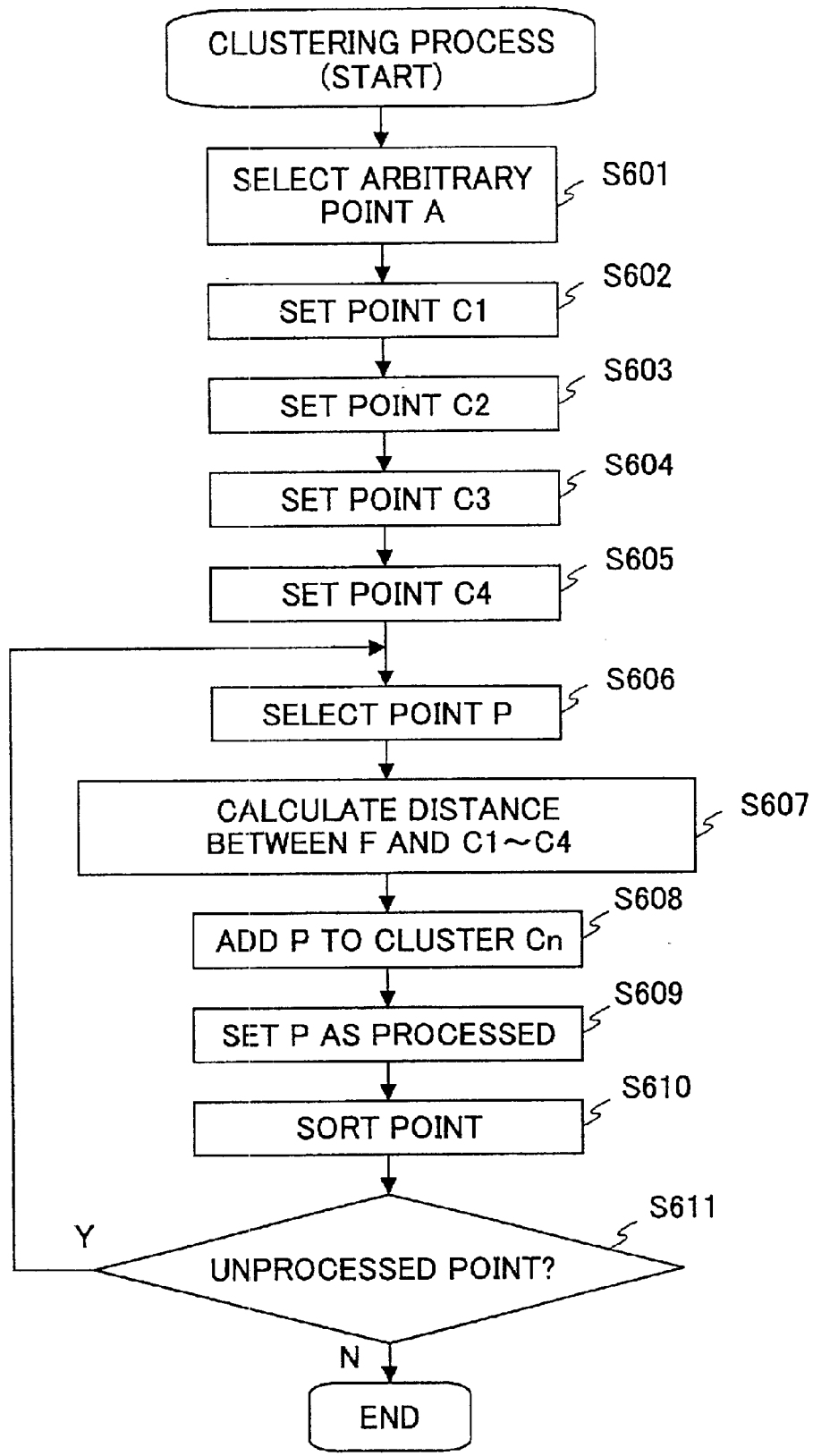
FIG. 22 is a flowchart of a clustering process according to the second embodiment of the present invention.

FIG. 22 is a flowchart of the clustering process according to the second embodiment of the present invention.

In the cluster process shown in FIG. 22, an arbitrary point A is selected first (step S601). Then, a point at which the above-mentioned evaluation equation (1) takes a maximum value with respect to the selected point A is set as a point c1 (step S602). Subsequently, a point at which the evaluation equation (2) takes a maximum value is set as a point c2 (step S603). A point at which the evaluation equation (3) takes a maximum value is set as a point c3 (step S604). A point at which the evaluation equation (4) takes a maximum value is set as a point c4 (step S605). Thereafter, an arbitrary point P, which has not been processed, is selected (step S606). Distances between the selected point P represented by the equation (5) and each of the points c1, c2, c3 and c4 are calculated (step S607). Then, the point P is added to the cluster cn having the smallest distance (step S608). The selected point P is rendered to be as processed (step S609). All points are sorted in ascending order of the difference distances (step S610). The process of steps S606 through S610 is repeated until unprocessed points are eliminated (step S611). Other processes that area not described are the same as the above-mentioned first embodiment.

The present invention is not limited to the specifically disclosed embodiments, and variations and modifications may be made without departing from the scope of the present invention.

The present application is based on Japanese priority applications No. 2001-079007 filed on Mar. 19, 2001, No. 2001-162701 filed on May 30, 2001, the entire contents of which are hereby incorporated by reference.

What is claimed is:

1. An image-space display method of extracting features from images, hierarchically dividing a feature space of the features, virtually converting the images into a tree structure, dividing a display space according to the tree-structure, and displaying the image space by displaying the images on each of the divided display spaces, the method further comprising the steps of:

generating a tree-structure for each of the features;

generating dimension data corresponding to a number of the features by mapping each tree structure in one-dimension; and displaying the dimension data on the corresponding divided display spaces as display coordinate-axis data.

2. The image space display method as claimed in claim 1, wherein dividing the display space includes the step of:

obtaining distances between each point of the features and center points of two clusters with respect to each point;

sorting each points according to a difference between the obtained distances;

and dividing the display space into two clusters by setting a boundary of the clusters according to an order of the sorting.

3. The image space display method as claimed in claim 2, wherein the boundary of the clusters is set between points of which a difference of distances preceding and proceeding points is largest in the order of the sorting.

4. The image space display method as claimed in claim 3, wherein an area corresponding to one of dimensions of the display space is divided in accordance with distances to center points of the two clusters and a ratio of differences of the difference distances at the boundary of the clusters.

5. The image space display method as claimed in claim 2, wherein the boundary of the clusters corresponds to a halfway point in the order of the sorting.

6. The image space display method as claimed in claim 1, wherein the features are three-dimensional data corresponding to form, texture and color of the images, and the features are displayed by using the three-dimensional data as display coordinate-axes data.

7. An image-space display method of extracting features from images, hierarchically dividing a feature space of the features, virtually converting the images into a tree structure, dividing a display space according to the tree-structure, and displaying the image space by displaying the images on each of the divided display spaces, the method further comprising the steps of:

assigning the extracted features to respective dimensional axes of the display space;

dividing recursively the feature space into four sub-spaces in accordance with the dimensional axes while reflecting a relationship between the images arranged in a two-dimensional display space in a relationship between the images on the feature space; and locating the tree-structure of each sub-space in four sub-spaces generated by dividing the two-dimensional display space.

8. The image space display method as claimed in claim 7, wherein when selecting a main image of each sub-space in the step of dividing into four sub-spaces, the main image is sequentially determined based on a result of calculation according to an evaluation equation that is previously established based on a distance to main image previously determined in consideration with a positional relationship with respect to each feature.

9. The image space display method as claimed in claim 8, wherein the once determined main image is recalculated based on evaluation equations based on three other main images so as to determine the main image again based on a result of the recalculation.

10. The image space display method as claimed in claim 9, wherein a position of the main image is calculated repeatedly until a change in the position does not occur, and the position at which a change does not occur is selected as the position of the main image.

11. The image space display method as claimed in claim 7, wherein when a number of images assigned to the closest main image exceeds a maximum number of images containable in the sub-space containing the closest main image, a process of removing one of the images farthest to the main image from the sub-space concerned is repeatedly performed so as to distribute the images uniformly to the sub spaces.

12. The image space display method as claimed in claim 7, wherein a three-dimensional display space is used instead of the two-dimensional display space.

13. An image-space display apparatus for extracting features from images, hierarchically dividing a feature space of the features, virtually converting the images into a tree structure, dividing a display space according to the tree-structure, and displaying the image space by displaying the images on each of the divided display spaces, the apparatus comprising:

means for generating a tree-structure for each of the features;

means for generating dimension data corresponding to a number of the features by mapping each tree structure in one-dimension; and means for displaying the dimension data on the corresponding divided display spaces as display coordinate-axis data.

14. An image-space display apparatus for extracting features from images, hierarchically dividing a feature space of the features, virtually converting the images into a tree structure, dividing a display space according to the tree-structure, and displaying the image space by displaying the images on each of the divided display spaces, the apparatus comprising:

means for assigning the extracted features to respective dimensional axes of the display space;

means for dividing recursively the feature space into four sub-spaces in accordance with the dimensional axes while reflecting a relationship between the images arranged in a two-dimensional display space in a relationship between the images on the feature space; and means for locating the tree-structure of each sub-space in four sub-spaces generated by dividing the two-dimensional display space.

15. A computer-readable medium having a program embodied therein for causing a computer to extract features from images, hierarchically divide a feature space of the features, virtually convert the images into a tree structure, divide a display space according to the tree-structure, and display the image space by displaying the images on each of the divided display spaces, said program comprising:

- a program code for generating a tree-structure for each of the features;
- a program code for generating dimension data corresponding to a number of the features by mapping each tree structure in one-dimension; and
- a program code for displaying the dimension data on the corresponding divided display spaces as display coordinate-axis data.

16. A computer-readable medium having a program embodied therein for causing a computer to extract features from images, hierarchically divide a feature space of the features, virtually convert the images into a tree structure, divide a display space according to the tree-structure, and display the image space by displaying the images on each of the divided display spaces, said program comprising:

- a program code for assigning the extracted features to respective dimensional axes of the display space;
- a program code for dividing recursively the feature space into four sub-spaces in accordance with the dimensional axes while reflecting a relationship between the images arranged in a two-dimensional display space in a relationship between the images on the feature space; and
- a program code for locating the tree-structure of each sub-space in four sub-spaces generated by dividing the-two-dimensional display space.

* * * * *